(No Model.)

T. A. JENNINGS.
SANITARY PLUG.

No. 537,892. Patented Apr. 23, 1895.

Inventor
Thomas A. Jennings.

Witnesses
Wm T. Doyle

By his Attorneys.
C. A. Snow & Co.

United States Patent Office.

THOMAS A. JENNINGS, OF NEWPORT, RHODE ISLAND, ASSIGNOR OF THREE FOURTHS TO PATRICK H. DUNN AND MICHAEL W. CALLAGHAN, OF SAME PLACE.

SANITARY PLUG.

SPECIFICATION forming part of Letters Patent No. 537,892, dated April 23, 1895.

Application filed January 21, 1893. Serial No. 459,119. (No model.)

*To all whom it may concern:*

Be it known that I, THOMAS A. JENNINGS, of Newport, in the county of Newport and State of Rhode Island, have invented a new and Improved Sanitary Plug, of which the following is a full, clear, and exact description.

My invention relates to a sanitary plug for closing the ends of soil and other pipes to prevent the escape of gases, &c.; the object in view being to provide a simple, inexpensive, and efficient construction whereby the center or plug proper may be readily removed without injuring the pipe or the bushing which is arranged between said center or plug proper and the walls of the pipe; and, furthermore, to provide means whereby the interposed bushing may be expanded at the time of applying the device to a pipe, or subsequently after the contraction of the parts due to changes of temperature and other causes; and, furthermore, to provide means for breaking the joint between the bushing and the pipe to prevent longitudinal movement of the bushing during the adjustment of the center or plug proper and prevent the opening of the joint between the bushing and the pipe in case of a slight contraction of the bushing or expansion of the pipe.

Further objects and advantages of the invention will appear in the following description, and the novel features thereof will be particularly pointed in the claim hereto appended.

Figure 1:
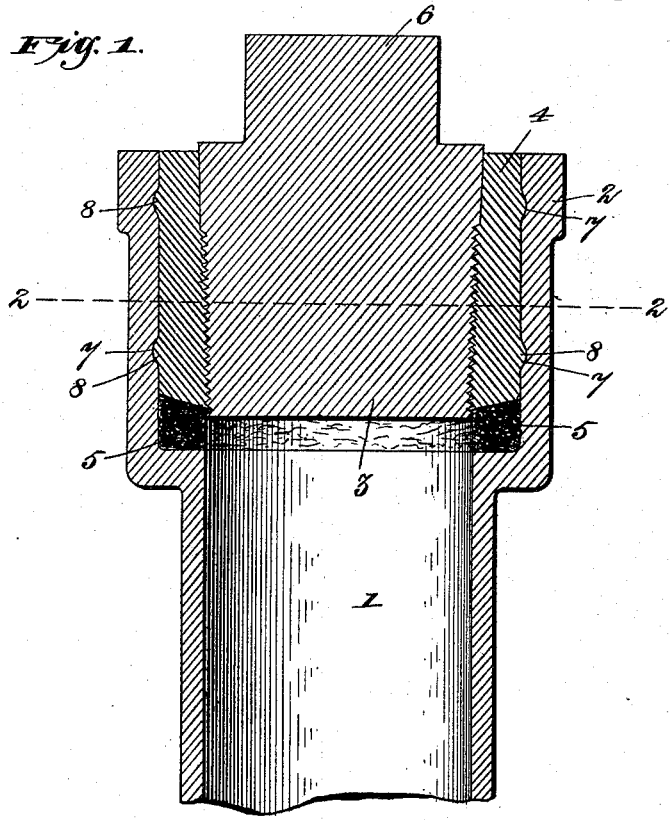
Figure 2:
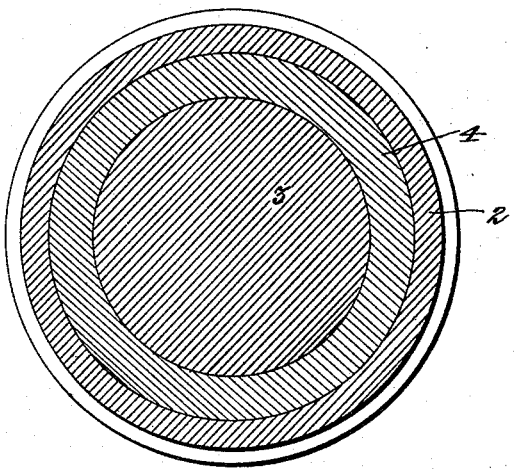

In the drawings—Figure 1 is a central section of a plug embodying my invention applied in the operative position to a pipe. Fig. 2 is a transverse section of the same on the line 2—2 of Fig. 1.

Similar numerals of reference indicate corresponding parts in both figures of the drawings.

1 designates a pipe which, in the construction illustrated in the drawings, is provided with an expanded or bell-mouth 2, although it will be understood that this construction of pipe is not necessary to the operativeness of my invention, and 3 represents the center or plug proper, which is arranged axially in the end of the pipe and is spaced at all points from the interior surface of the pipe.

Interposed between the sides of the center or plug and the walls of the pipe is an annular bushing which extends inward to a point adjacent to the inner extremity of the center or plug proper, and in contact with a soft filling 5 adapted to be arranged in the pipe previous to the insertion of the bushing.

The center or plug proper is conical in shape, being tapered toward its inner end and it is threaded from a point adjacent to its outer end to the surface of its inner end, the outer extremity of the plug being shaped to form a wrench seat 6.

The walls of the pipe are provided with annular grooves or depressions 7, and the bushing with corresponding annular ribs 8, fitting in said grooves or depressions, and thus breaking the joint between the bushing and the pipe.

To arrange the improved plug in the end of a pipe the center or plug proper is held axially therein and out of contact at all points with the pipe, and the filling 5 is arranged within the pipe between the side surface of the center of the plug proper and the adjacent inner surface of the pipe after which the molten metal, which is to form the bushing 4, is poured into the annular space between the center and the pipe and upon the filling. It will be seen that this filling prevents the flowing of the molten metal into the interior of the pipe beyond the end of the center or plug proper.

The object in arranging the plug proper out of contact at all points with the pipe in which it is arranged is that after the metal forming the bushing has become partly cooled said plug proper may be turned by means of a wrench to drive it longitudinally or axially into the pipe and thus expand the bushing and insure tight joints between the bushing and the surfaces of the plug and pipe. This expanding of the bushing by turning the plug proper and causing it to feed inward by reason of its threaded surface provides for a taking up of looseness between the parts in case of contraction due to changes of temperature.

The annular projections or ribs on the outer surface of the bushing and in engagement with the grooves in the inner surface of the pipes prevent longitudinal movement of the bushing within the pipe when the center or plug is turned to advance it into the bushing, and also prevent accidental displacement of the plug in case of looseness caused by contraction.

In the construction illustrated in the drawings, the filling 5 is arranged upon a shoulder at the inner end of the bell-mouth of the pipe, but it will be understood that inasmuch as the function of this filling is to prevent the flowing of the metal forming the soft bushing into the interior of the pipe beyond the plug it may be arranged in a pipe which is not provided with a bell-mouth.

In order to facilitate the inward and outward turning of the plug, the surface of the latter is provided with cutting threads, or threads which are angular in cross-section and are provided with sharp outer edges, and in order to insure a firm seating of the plug and facilitate inward adjustment thereof to expand the bushing the latter is made of a length approximately equal to the plug, as clearly shown in the drawings. The filling 5 is arranged to just overlap slightly the inner end of the plug, whereby the bushing, when inserted, extends from the outer end of the plug to a point approximately in the plane of the inner end thereof. The use of this considerable amount of material in the bushing is not a loss, as a bushing may be used a second time if it is desired to again close the end of the pipe, the looseness caused by the removal of the plug being taken up when the latter is again inserted by screwing the plug farther into the bushing.

In practice, various changes in the form, proportion and minor details of construction may be resorted to without departing from the spirit or sacrificing any of the advantages of this invention.

Having described my invention, what I claim is—

The combination with a pipe having an enlarged mouth or bell-portion, of an inwardly tapered plug centered in the mouth of the pipe and provided with exterior cutting threads, the inner end of the plug being separate from the inner end or throat of the mouth or bell-portion, whereby it does not come in contact therewith an annular filling 5 arranged between the exterior surface of the plug and the interior of the mouth at the inner end of the plug, said filling overlapping slightly to break joint with the plug, a soft metal bushing arranged in the annular space between the plug and the inner surface of the mouth of the pipe and bounded at its inner end by said filling, whereby the bushing is approximately equal in length to the plug and is engaged for the greater portion of its length by the cutting threads of the plug, and means for preventing longitudinal movement of the bushing in the mouth of the pipe, whereby the plug may be turned to cause it to feed inward to expand the bushing, substantially as specified.

THOMAS A. JENNINGS.

Witnesses:
HERBERT PECKHAM,
MICHAEL W. CALLAGHAN.